United States Patent [19]

Abe et al.

[11] 3,710,017

[45] Jan. 9, 1973

[54] TV RECEIVER CONCURRENTLY ACTING AS A MONITOR

[75] Inventors: Takuzi Abe, Tokyo; Minoru Yuda, Kawasaki, both of Japan

[73] Assignee: Tokyo Shibaura Electric Co., Ltd., Kawasaki-shi, Japan

[22] Filed: May 3, 1971

[21] Appl. No.: 139,564

[30] Foreign Application Priority Data

| | | |
|---|---|---|
| May 8, 1970 | Japan | 45/44327 |
| May 8, 1970 | Japan | 45/44328 |
| Aug. 10, 1970 | Japan | 45/69315 |
| Aug. 10, 1970 | Japan | 45/78859 |
| Sept. 21, 1970 | Japan | 45/92912 |
| Sept. 21, 1970 | Japan | 45/92914 |

[52] U.S. Cl..........178/6.8, 178/DIG. 6, 178/DIG. 23, 178/DIG. 35, 178/7.5 R

[51] Int. Cl...........H04n 5/22, H04n 5/48, H04n 7/02

[58] Field of Search...178/DIG. 6, DIG. 23, DIG. 35, 178/6.8, 7.5 R

[56] References Cited

UNITED STATES PATENTS 3,612,761 10/1971 Wolff..............................178/DIG. 35

*Primary Examiner*—Howard W. Britton
*Attorney*—Flynn & Frishauf

[57] ABSTRACT

A TV receiver concurrently acting as a monitor comprising means for separating TV synchronizing signals from detected TV image signals; camera tube deflecting means including a device for generating in synchronization with said separated TV synchronizing signals square wave synchronizing signals having a width equal to $1/n$ ($n$   $1$) of the period of the first mentioned TV synchronizing signals thereby to supply deflecting signals corresponding to the width of said square wave signals to the image pickup tube of the camera and scan said image pickup tube with a period $1/n$ times that of scanning TV image signals; a camera device for producing image signals by said deflecting means; means for obtaining gate signals from horizontal and vertical square wave synchronizing signals; means for generating composite image signals by selectively drawing out TV image signals and camera image signals in prescribed timing according to said gate signals; and means for supplying said composite image signals to the receiving tube, thereby simultaneously reproducing part of a TV image and the whole of a camera image.

16 Claims, 18 Drawing Figures

TV RECEIVER CONCURRENTLY ACTING AS A MONITOR

Background of the Invention

This invention relates to a TV receiver concurrently acting as a monitor and more particularly a TV receiver which is capable of simultaneously reproducing part of a TV image and the whole of a camera image.

As a result of improvements in industrial TV cameras, there have been widely accepted compact TV cameras. However, the image of such camera has to be monitored at a point remote from the place where the image is picked up. There is raised, therefore, a problem as to whether the camera image can be monitored by an ordinary cathode ray tube. This problem may in short be reduced to the possibility of, for example, reproducing a camera image in a quarter of the image area of a cathode ray tube and presenting a TV image in the remaining three-quarters of said area. Such method of reproduction has already been attempted. However, the prior art process has enabled only part of a camera image to be reproduced in said quarter area of the cathode ray tube and not the whole of the camera image. In this case it is extremely difficult to visualize the whole of a camera image from a fractionally reproduced portion thereof. To resolve this problem it is necessary temporarily to interrupt the reproduction of a TV image in order to present an entire camera image on the whole screen of a cathode ray tube. Obviously, such reproduction method fails fully to display the function of simultaneously receiving TV images and monitoring camera images by the same receiving tube.

As a result of recent improvements and wide acceptance of a magnetic recording and reproducing apparatus, there is a growing demand to record TV images in advance and reproduce the recorded images on a cathode ray tube and similarly record camera images in advance and reproduce them on the same cathode ray tube. Since, however, the image signals of a simple camera device do not contain synchronizing signals, there are presented considerable difficulties in coupling a magnetic recording and reproducing device with a TV receiver concurrently acting as a camera image monitor in order to meet the aforesaid demand.

Summary of the Invention

It is accordingly an object of this invention to provide a TV receiver concurrently acting as a monitor which is capable of simultaneously reproducing on the same cathode ray tube part of a TV image and the whole of a camera image.

Another object of the invention is to provide a TV receiver concurrently acting as a monitor which is capable of not only simultaneously reproducing on the same cathode ray tube part of a TV image and the whole of a camera image but also recording and reproducing either or both of the TV and camera images.

Still another object of the invention is to provide a TV receiver concurrently acting as a monitor which enables the reproduction area of a TV image and that of a camera image to be varied in an arbitrary ratio.

According to this invention, there are separated horizontal and vertical TV synchronizing signals from output of a circuit for amplifying detected TV image signals. Deflecting signals formed from the separated TV synchronizing signals are supplied to a cathode ray tube. There is separately provided a camera device for generating a camera image. There is further provided a camera tube deflecting means comprising of a circuit for generating simultaneously with the separated TV synchronizing signals square wave synchronizing signals having a width equal to $1/n$ ($n \geqq 1$) of the period of the first mentioned TV synchronizing signals and a circuit for forming camera tube deflecting signals corresponding to the width of said square waves. Said camera tube is scanned with a period $1/n$ times that of scanning TV image signals. There is also provided a circuit for generating gate signals by composing the aforementioned square wave synchronizing signals. Said gate circuit is supplied with TV image signals and camera image signals. These two types of signals are selectively drawn out according to the supplied gate signals to form desired composite image signals. Said composite signals are supplied to a cathode ray tube to reproduce simultaneously part of a TV image and the whole of a camera image in the different regions of the screen of said cathode ray tube.

Further, this invention enables the area occupied by a camera image on the cathode ray tube screen to be adjusted by changing the width of square waves obtained from the camera tube deflecting means. For example, when the horizontal and vertical wave synchronizing signals are made to have a width equal to $1/n$ ($n \geqq 1$) of the period of TV synchronizing signals, then it is possible to reproduce together with part of a TV image a camera image having an area reduced to $1/n^2$ the area which the TV image would occupy when reproduced alone. Further, a change of the phase or polarity of the square wave synchronizing signals enables a camera image to be presented at any desired part of the cathode ray tube screen. For example, it is possible to reproduce a camera image in the lower right hand corner of the cathode ray tube screen in an area equal to a quarter of the entire screen surface, thereby enabling the contents of the TV image to be fully recognized while observing the whole of the camera image.

According to another embodiment of this invention, it is possible to superimpose separated TV synchronizing signals on camera image signals and to connect the input and output sides of a magnetic recording and reproducing apparatus to the TV receiver circuit properly, thereby recording and reproducing both the TV and camera images.

DESCRIPTION OF THE PREFERRED EMBODIMENTS

Figure 1:
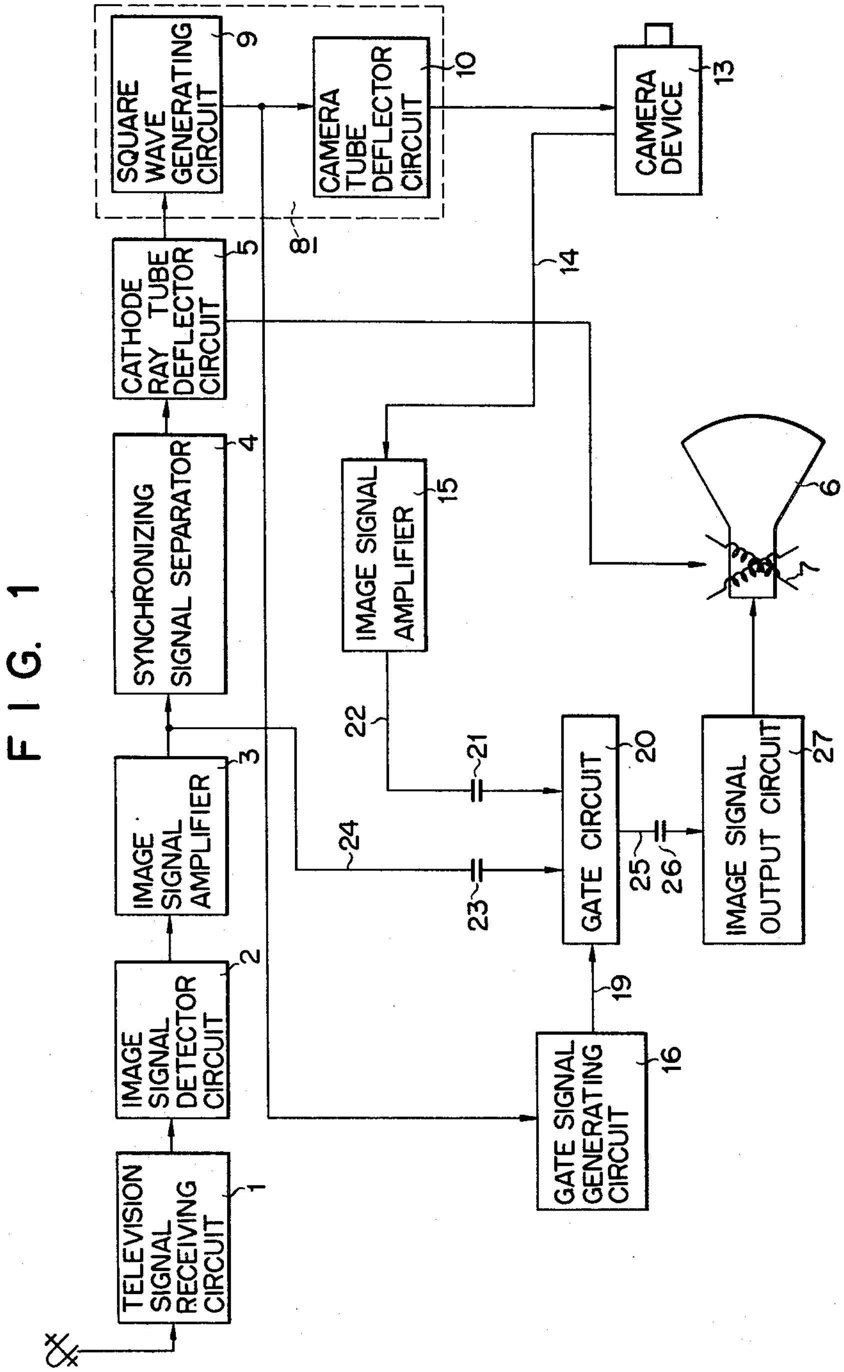
FIG. 1 is a circuit diagram of a TV receiver concurrently acting as a monitor according to an embodiment of this invention which is capable of simultaneously reproducing on the same cathode ray tube part of a TV image and the whole of a camera image.

Referring to FIG. 1, TV signals are received through an antenna terminal by a receiving circuit 1 including a tuner, a circuit for amplifying the intermediate frequency of image signals, etc. The output signal from said circuit 1 is detected by an image signal detecting circuit 2, output signals from which are amplified by an image signal amplifier 3, the output of amplifier 3 also containing horizontal and vertical TV synchronizing signals. These synchronizing signals (horizontal and vertical) are derived out by means of a synchronizing signal separating circuit 4 and supplied to a cathode ray tube deflecting circuit 5. This circuit 5 which is included in a first deflecting means is of the known saw-tooth wave generating type, the saw-tooth waves from which are supplied to the deflection coil 7 of a cathode ray tube 6.

Numeral 8 represents a second deflecting means, which comprises a square wave generating circuit 9 and a deflecting wave generating circuit 10. In practice, this second deflecting means is provided for both horizontal and vertical TV synchronizing signals. However, FIG. 1 represents said means in a form combining two units thereof. It will be noted that though the following description relates to horizontal synchronizing signals, the same applies to vertical synchronizing signals. The square wave generating circuit 9 generates square waves in synchronization with TV synchronizing signals by trigger signals supplied from the cathode ray tube deflecting circuit 5. Said square waves have a width equal to $1/n$ ($n \geqq 1$) of the period $T_H$ of the TV synchronizing signals, that is, $T_H/n$ (in the case of horizontal synchronizing signals). When supplied with said square waves, the deflecting wave generating circuit 10 forms camera tube deflecting waves corresponding to the width of said square waves.

Numeral 13 denotes a simple camera device having a vidicon tube. When said camera device is supplied with said deflecting waves, its tube is scanned with a period $1/n$ times that of scanning TV signals.

The second deflecting means 8 will be detailed later. Camera image signals obtained by the aforesaid scanning conducted with a $1/n$-fold period are amplified by an image signal amplifier 15.

Figure 2:
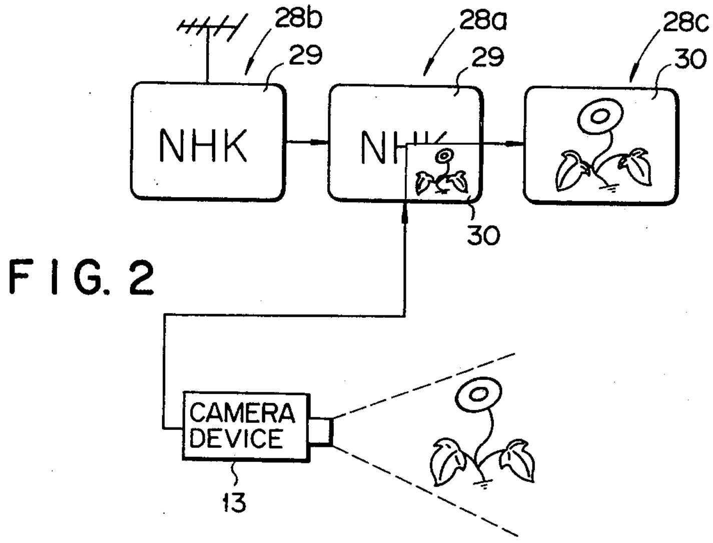
FIG. 2 is a schematic representation of images reproducible on a cathode ray tube by means of the device of FIG. 1.

Numeral 16 represents a gate signal generating circuit which composes the horizontal and vertical square wave synchronizing signals derived from the second deflecting means 8. The resulting gate signals 19 are conducted to a gate circuit 20, which is supplied with output 22 from the image signal amplifier 15 through a condenser 21 and output 24 from the TV image amplifier 3 through a condenser 23. The gate signals 19 selectively draw out image signals 22 and 24 at any desired time according to the phase and polarity of said gate signals 19, thereby drawing out desired composite image signals 25 from the gate circuit 20. Said composite image signals 25 are supplied to an image signal output circuit 27, whose output in turn is conducted to the grid or cathode of the cathode ray tube 6. The aforementioned arrangement causes part of a TV image and the whole of a camera image to be reproduced in the different regions of the screen surface of said cathode ray tube 6. Namely, as illustrated in the picture 28a of FIG. 2, it is possible to reproduce a TV image 29 in a region constituting three-quarters of the cathode ray tube screen and an image 30 picked up by a camera 13 in the lower right hand corner thereof in an area corresponding to about a quarter of the entire screen surface. Or if required, it is possible to reproduce a TV image 29 alone shown in the picture 28*b* of FIG. 2 or a camera image 30 along shown in the picture 28*c* of FIG. 2.

Figures 3A, 3B, 3C:
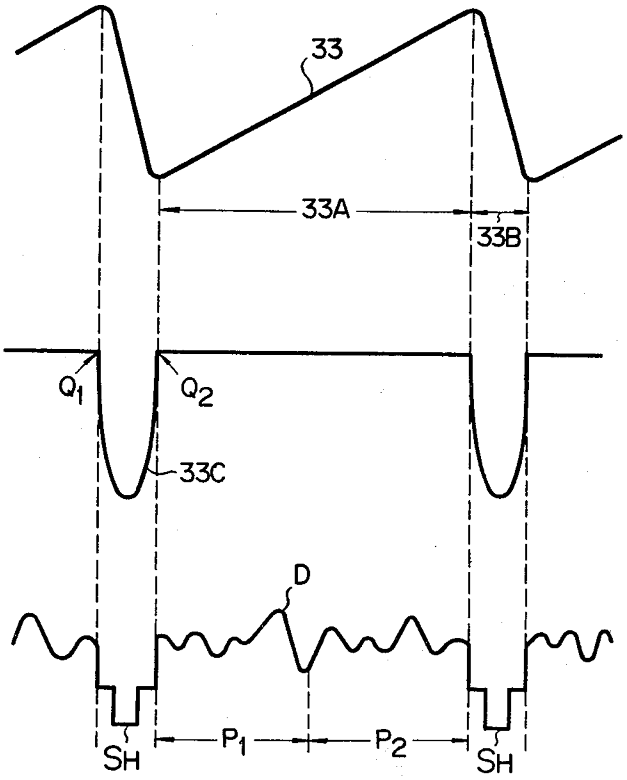
FIG. 3A shows the wave form of current passing through the horizontal deflection coil of a cathode ray tube.
FIG. 3B indicates fly-back pulses generated across the input terminal of said deflection coil.
FIG. 3C illustrates the wave form of TV image signals containing horizontal synchronizing signals.

There will now be described the second deflecting means 8 and the means for combining TV and camera images. FIG. 3A shows the wave form 33 of current passing through a horizontal deflection coil included in an ordinary cathode ray tube. Said wave form consists of a portion representing a horizontal scanning period 33A and another portion representing a fly-back period 33B. Across both ends of the horizontal deflection coil is generated pulse voltage or fly-back pulse 33C shown in FIG. 3B in synchronization with the fly-back period 33B. FIG. 3C presents TV image signals D containing horizontal TV synchronizing signals $S_H$ . The fly-back period 33B and pulse voltage 33C have the same span of time as the horizontal TV synchronizing signals $S_H$. When, therefore, the screen surface of the cathode ray tube 6 is scanned by a beam of electrons during the scanning period 33A, then there is reproduced a desired TV image by an image signal D generated between the adjacent horizontal TV synchronizing signals $S_H$. During the fly-back period 33B there is not reproduced any image due to the action of a fly-back extinction circuit as is the case with an ordinary cathode ray tube.

Figures 4A, 4B, 4C, 4D:
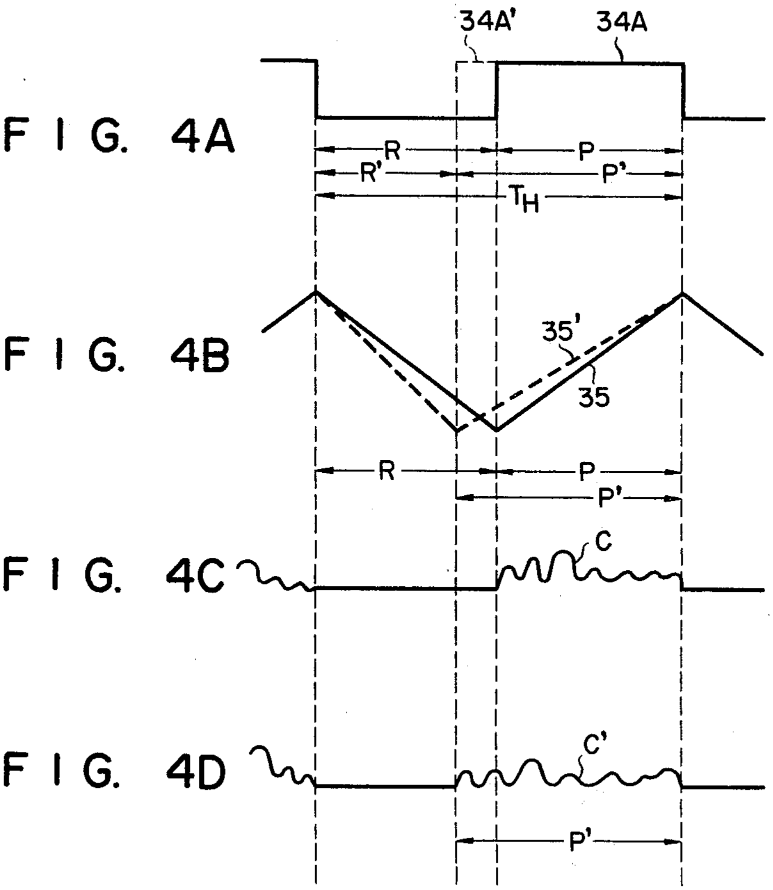
FIG. 4A indicates the wave form of the output voltage from the square wave generating circuit of FIG. 1.
FIG. 4B shows the wave form of current deflecting the camera tube.
FIGS. 4C and 4D represent the wave forms of camera image signals to be reproduced.

On the other hand, the square wave generating circuit of the second deflecting means 8 is so designed as to produce a symmetrical square wave 34A indicated in solid lines in FIG. 4A in synchronization with horizontal TV synchronizing signals $S_H$. With a cathode ray tube, the horizontal deflection coil has to be supplied with saw-tooth wave current 33 shown in FIG. 3A. With a camera device 13, impression of square wave voltage 34A illustrated in FIG. 4A on a camera tube deflecting coil facilitates the generation of triangular wave deflecting current 35 shown in FIG. 4B. When, therefore, the square wave 34A is chosen to have a width equal to half the period of TV synchronizing signals, scanning will be performed twice during one scanning period of a cathode ray tube. As used in this invention, such square wave is referred to as "a symmetrical square wave".

When a camera tube is scanned by the aforementioned triangular deflecting wave 35, said scanning is conducted in opposite directions between the scanning subperiods P and R. Further in case of horizontal scanning, there is reproduced a camera image with both sides reversed. In case of vertical scanning, said camera image is presented upside down. Since the symmetrical square wave 34A is generated by a trigger signal synchronized with TV synchronizing signals, for example, by a horizontal fly-back pulse 33C shown in FIG. 3B, the scanning of the camera tube by the triangular deflecting wave 35 is synchronized with that of the cathode ray tube.

Figure 6:
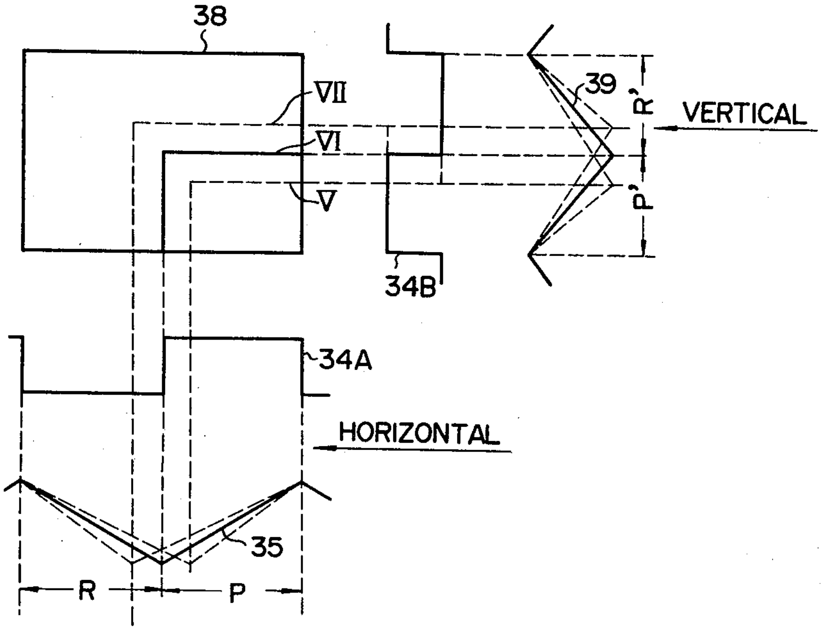
FIG. 6 is a schematic illustration of the manner in which the area occupied by a camera image reproduced on a cathode ray tube screen is enlarged or reduced.

When, at this point, the camera image signals C generated during the subperiod P of scanning carried out by the triangular deflecting wave 35 are reproduced on the cathode ray tube 6 through the gate circuit 20, without causing the camera image signals (not shown) generated during the subperiod R of reverse scanning to be supplied to the cathode ray tube through the same gate circuit 20, then the aforesaid reverse deflecting current wave will not obstruct the reproduction of a camera image together with a TV image. The gate circuit 20 performs the aforesaid selective withdrawal of TV and camera image signals and supplies during the scanning subperiod R shown in FIG. 4B those of TV image signals D (FIG. 3C) which correspond to a scanning subperiod $P_1$ (FIGS. 3C and 4C). In this case, the synchronizing signals $S_H$ contained in said TV image signals are of course inserted in the combined image signals. When the square symmetrical wave 34A is made to have a width broadened up to the dotted line of FIG. 4A, then there are obtained camera image signals C′ scanned by a triangular wave 35′ during the subperiod P′. As previously described, the area of a camera image can be adjusted, as shown in FIG. 6, by varying the width of the square wave 34A. If, in this case, the gate circuit 20 is operated according to the phase in which the square wave 34A is generated, then it will be possible to determine the region of the cathode ray tube screen where there is to be reproduced a camera image. Said determination is controlled by the phase of a square wave 34A generated and the gating timing of the later described gate signal generating circuit.

When the horizontal deflection coil of the camera tube is supplied with the square wave 34A of FIG. 4A, there is obtained, as previously mentioned, the triangular deflecting wave 35 of FIG. 4B. With the vertical deflection coil of the camera tube, however, it is necessary directly to supply voltage having the same wave form as the triangular deflecting wave 35 across the ends of said vertical deflection coil, because it has greater resistance than inductance. Said triangular voltage is easily obtained by passing the square wave voltage of FIG. 4A through a Miller's integrator circuit. The symmetrical square wave voltage is generated by a symmetrical multivibrator or Schmidt trigger circuit.

When the square wave 34A is varied in phase (as well as in polarity), the camera image can be reproduced, as previously described, in a different region on the cathode ray tube screen. Where the square wave generating circuit 9 is triggered at the front porch $Q_1$ or back porch $Q_2$ of pulse voltage (FIG. 3B), then the camera image is reproduced in the regions shown in the table below the FIG. 5.

Figure 5:
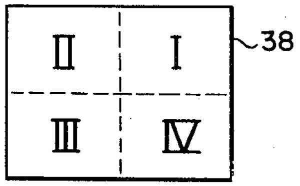
FIG. 5 identifies those regions of the screen surface of a cathode ray tube where there is to be reproduced a camera image.

| Position of camera image in FIG. 5 | Position where there is triggered a circuit generating square waves for horizontal deflection of a camera tube | Position where there is triggered a circuit generating square waves for vertical deflection of a camera tube |
|---|---|---|
| I | Front porch | Back porch |
| II | Back porch | Back porch |
| III | Back porch | Front porch |
| IV | Front porch | Front porch |

Referring to FIG. 5, numeral 38 denotes the total area of the screen of the cathode ray tube 6 where there are reproduced the images of foreground subjects and the numerals I, II, III and IV represent the regions where the camera image is reproduced. These positions of the camera image have relationships given in the above table with the positions where the square wave generating circuit 9 is triggered. As seen from the above table, the camera image can be reproduced in whole in any desired region on the cathode ray tube screen. The foregoing description relates to the case where the size of a camera image was reduced to a quarter of the entire cathode ray tube screen. However, the size of the camera image can be freely changed by varying the duty cycle of the square waves.

Referring again to FIG. 4, when the pulse width of the square wave voltage is broadened, as shown in FIG. 4A, from P to P′, the width of deflecting waves 35 is similarly extended from P to P′, obtaining deflecting waves 35′, and in consequence the period in which the cathode ray tube is supplied with camera image signals C is prolonged to form camera image signals C′. However, the camera image reproduced in enlarged form by the camera image signals C′ has exactly the same contents as the camera image produced by the camera image signals C.

The area of a camera image reproduced and the square wave for deflecting a camera tube have an interrelationship presented in FIG. 6. In this figure, numeral 38 denotes the whole area of a cathode ray tube screen where there are reproduced the images of foreground subjects, numeral VI a quarter of said area occupied by a camera image, V a smaller camera image region than said quarter region and VII a larger camera image region. 34A represents a square wave for horizontally deflecting a camera tube, 35 a horizontal deflection current wave, 34B a square wave for vertically deflecting a camera tube and 39 a vertical deflection voltage wave. During the horizontal and vertical deflection periods P and P′, there is obtained a camera image occupying the region VI. In the remaining region of the cathode ray tube screen is presented a TV image. Sections defined by dotted lines indicate the relationship of the areas occupied by the TV and camera images where the square wave is varied with width, and description thereof is omitted. It will be noted that square waves for horizontal and vertical deflections are supplied to the gate circuit 20 as gate signals so as to obtain TV and camera images as indicated in FIG. 6 by selectively gating the TV image signals and camera image signals by the gate circuit 20.

Figure 7A:
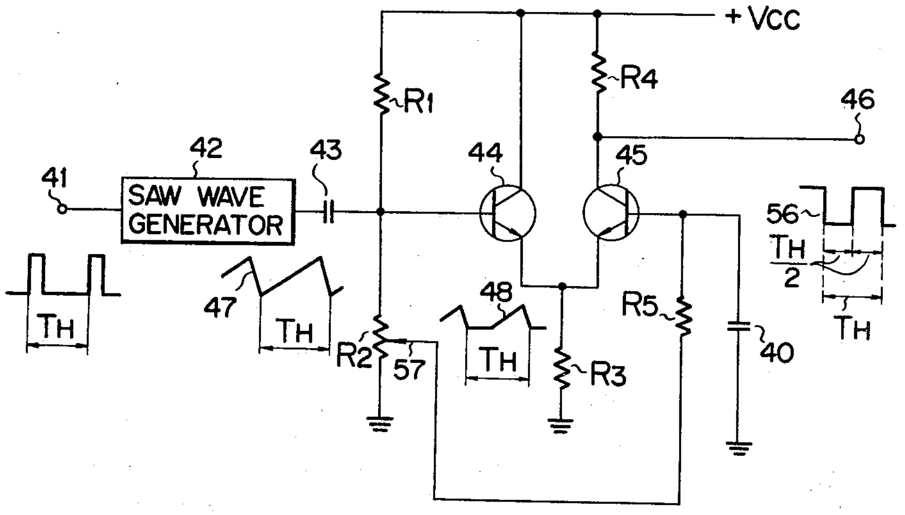
FIG. 7A is a concrete arrangement of the square wave generating circuit of FIG. 1.
Figure 7B:
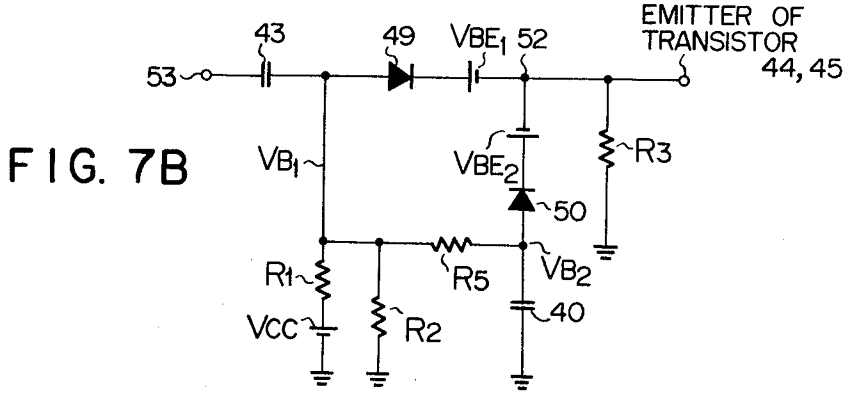
FIG. 7B is an equivalent circuit diagram of the same.
Figure 7C:
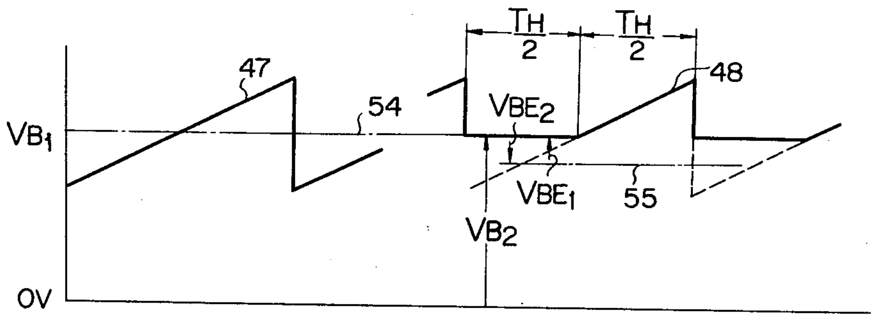
FIG. 7C illustrates the wave form associated with said circuit.

There will now be described by reference to FIG. 7 a square wave generating circuit according to another embodiment of this invention. FIG. 7A is a diagram of said square wave generating circuit, and FIG. 7B an equivalent circuit diagram. FIG. 7C represents the wave form illustrative of the operation of the circuit of FIG. 7A. Referring to FIG. 7A, the input terminal 41 of said square wave generating circuit is connected to the base of a first transistor 44 through a saw-tooth wave generating circuit 42 and condenser 43. The base of said transistor 44 is connected through a resistor $R_1$ to the positive pole of a D.C. source $V_{CC}$ and also grounded through a resistor $R_2$. There is further provided a second transistor 45, the common contact of the emitters of the first and second transistors 44 and 45 being grounded through a resistor $R_3$. The collector of the first transistor 44 is directly connected to the positive pole of the D.C. source and the collector of the second transistor 45 to said positive pole through a resistor $R_4$. The bases of the first and second transistors 44 and 45 are connected to each other through a resistor $R_5$, the base of the second transistor 45 being also grounded through a condenser 40. Numeral 46 is an output terminal connected to the collector of the second transistor 45.

The input terminal 41 of the square wave generating circuit is supplied with a fly-back pulse (FIG. 3B) generated by deflection output signals from a TV cathode ray tube concurrently acting as a monitor. With the period of said pulse designated as $T_H$, its width is not generally equal to half said period $T_H$. Said pulse is converted to a saw-tooth wave 47 of good linearity having a width $T_H$ by means of a saw-tooth wave generating circuit 42. The saw-tooth wave 47 is supplied through a condenser 43 to the bases of the transistors 44 and 45. The base potentials of these transistors 44 and 45 are maintained at substantially the same level due to the presence of a resistor $R_5$ alone, and moreover at a proper level by the action of the resistors $R_1$ and $R_2$.

Since the saw-tooth wave voltage is rectified by an integrated circuit consisting of the resistor $R_5$ and condenser 40, the base of the second transistor 45 is biased at the substantially central level of the saw-tooth wave voltage. At the contact of the emitter of said second transistor 45 is generated a voltage wave 48 corresponding to the upper part of said saw-tooth wave 47 as cut by a horizontal central line of the saw-tooth wave.

There will now be described the reason for the above-mentioned fact by reference to the equivalent circuit diagram of FIG. 7B. The same parts of FIG. 7B as those of FIG. 7A are denoted by the same numerals. $V_{B1}$ and $V_{B2}$ represent the base voltage of the first and second transistors respectively, and $V_{BE1}$ and $V_{BE2}$ denote voltage drop in the forward direction between the base and emitter of the first and second transistors respectively. Numerals 49 and 50 of FIG. 7B represent diodes, said figure equivalently showing the base-emitter arrangement of the first and second transistors respectively. Where, however, there are used transistors having the same properties, there generally result $V_{BE1}26\ V_{BE2}$ and $V_{B1} \approx V_{B2}$. Then the saw-tooth wave 47 supplied to the terminal 53 is conducted through the condenser 43 to the diode 49 as well as to the diode 50 through the resistor $R_5$. At this time, the base of the diode 50 is supplied with bias voltage $V_{B2}$. Accordingly, there is produced the wave form 48 of FIG. 7A at the cathode contact (emitter contact) 52 of the diodes 49 and 50, because the saw-tooth wave 47 supplied to the diode 50 is clipped by base voltage $V_{B2}$. This event is illustrated in enlargement in FIG. 7C Referring to FIG. 7C, numeral 54 represents an average level of the saw-tooth wave 47. Since the diode 50 is supplied with voltage $V_{BE2}$ in the backward direction, the wave 47 is clipped on line 55 shown in FIG. 7C. However, the diode 49 is impressed with voltage $V_{BE1}$ in the backward direction, causing the saw-tooth wave 47 to be clipped substantially at the level of $V_{B2} - V_{BE2} + V_{BE1}$, that is, on the line 54. Thus the saw-tooth wave 47 is converted to the sawtooth wave 48 having a width of $T_H/2$.

Said saw-tooth wave 48 having a width of $T_H/2$ is supplied to the emitter of the base-grounded transistor 45 to actuate it in saturated condition, generating a symmetrical square wave 56 having a pulse width of $T_H/2$ from the output terminal 46. This square wave generating means is characterized in that even when the properties and operation level of a transistor change due to temperature rise, it always produces a square wave having a constant pulse width. It will be apparent that there can be used the same form of square wave generating circuit with respect to the TV vertical synchronizing signals.

When the base of the transistors 44 and 45 included in said circuit is supplied with varying D.C. voltage, that is, when the position of the contact 57 of FIG. 7A is changed with respect to the resistor $R_2$, then there can be changed the clip level of the saw-tooth wave 47 and in consequence the width of the square wave 56.

The foregoing description relates to the case where the transistors 44 and 45 were of an NPN type. It will be apparent that the same operation can also be performed with respect to PNP transistors.

Figure 8A:
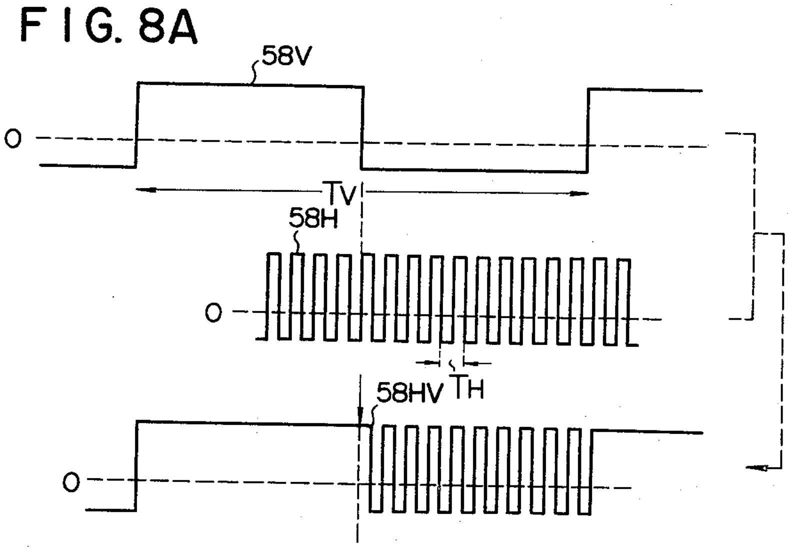
FIG. 8A shows the wave form of output signals from the gate signal generating circuit of FIG. 1.
Figure 8B:
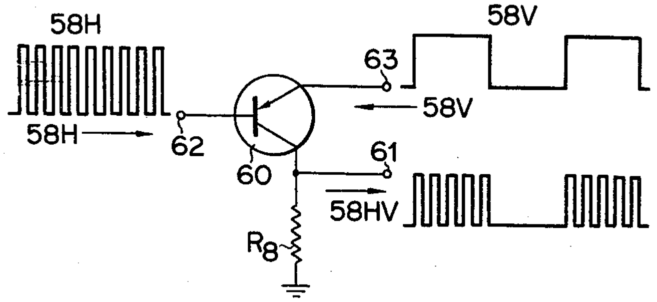
FIG. 8B is a concrete arrangement of said circuit.

There will now be described a gate signal generating circuit 16. Where it is desired to reproduce such an image as shown in the picture 28a of FIG. 2 by selectively drawing out camera image signals 22 and TV image signals 24 entering the gate circuit 20 of FIG. 1, it is only required to supply said gate circuit 20 with a composite signal consisting of horizontal and vertical deflection square waves generated by the square wave generating circuit of FIG. 1, that is, to supply said circuit 20 with a composite wave 58HV shown in FIG. 8A consisting of TV vertical and horizontal deflection square waves 58V and 58H. TV represents a period equal to that of TV vertical synchronizing pulses. FIG. 8B indicates the arrangement of square wave composing circuit. In this figure, the collector of a transistor 60 is grounded through a resistor $R_8$. The output terminal 61 of said composite signal 58HV is connected to said collector. The base terminal 62 of said transistor 60 is supplied with a square wave pulse 58H for horizontal deflection of a camera tube and the emitter terminal 63 thereof is supplied with a square wave pulse 58V for vertical deflection of a camera tube, causing a composite signal 58HV to be produced from an output terminal 61. Said composite signal 58HV is conducted to the gate circuit 20 of FIG. 1 and the resulting composite image signal 25 is drawn out through the condenser 26 and supplied to the cathode ray tube 6 through the image signal output circuit 27.

Referring to FIG. 8B, if necessary, the terminal 62 may be supplied with vertical deflection square wave pulses 58V and the terminal 63 with horizontal deflection square wave pulses 58H. There may also be used an NPN transistor.

Figure 9:
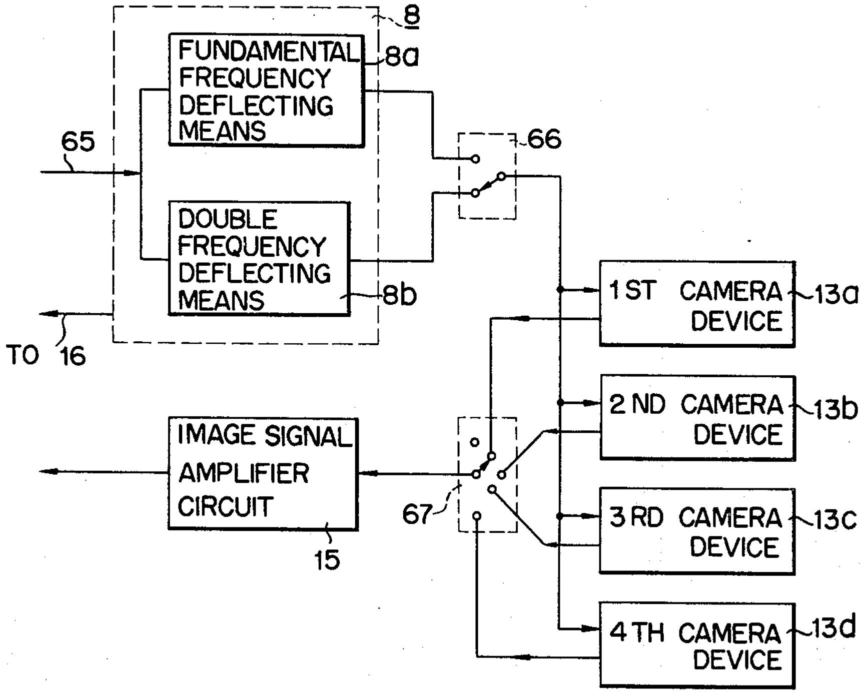
FIG. 9 is a partial circuit diagram of an embodiment of the invention where monitoring is carried out by selecting one of a plurality of camera devices.

This invention further enables a camera image arbitrarily selected from a plurality of camera devices to be reproduced on the cathode ray tube 6. This embodiment is presented in FIG. 9. The second deflection means 8 includes a one-fold frequency deflection means 8*a* for scanning a camera image with the same period as that in which a TV image is scanned and a double frequency deflection means 8*b* for scanning the camera image with a period equal to half the period of scanning the TV image. These deflection means are of the same type as those described by reference to FIG. 4. Said deflection means 8*a* and 8*b* are supplied with TV synchronizing signals or other synchronizing signals 65 simultaneously generated therewith. Outputs from the deflection means 8*a* and 8*b* are changed over by a switch 66, and supplied to the deflection coils of first to fourth camera devices 13*a* to 13*d*. Images picked up by the respective camera devices 13*a* to 13*d* are arbitrarily selected by a switch 67. A camera image thus selected is amplified by a signal amplifier 15 to be supplied to the gate circuit 20. On the other hand, horizontal and vertical square waves corresponding to the deflection means 8*a* and 8*b* are selected by a switch (not shown) and conducted to the gate signal generating circuit 16 of FIG. 1. The aforementioned arrangement enables the images derived from camera devices disposed at several places to be monitored, and the camera image thus selected to be reproduced on the entire surface of the cathode ray tube screen or on a quarter thereof.

Figure 10:
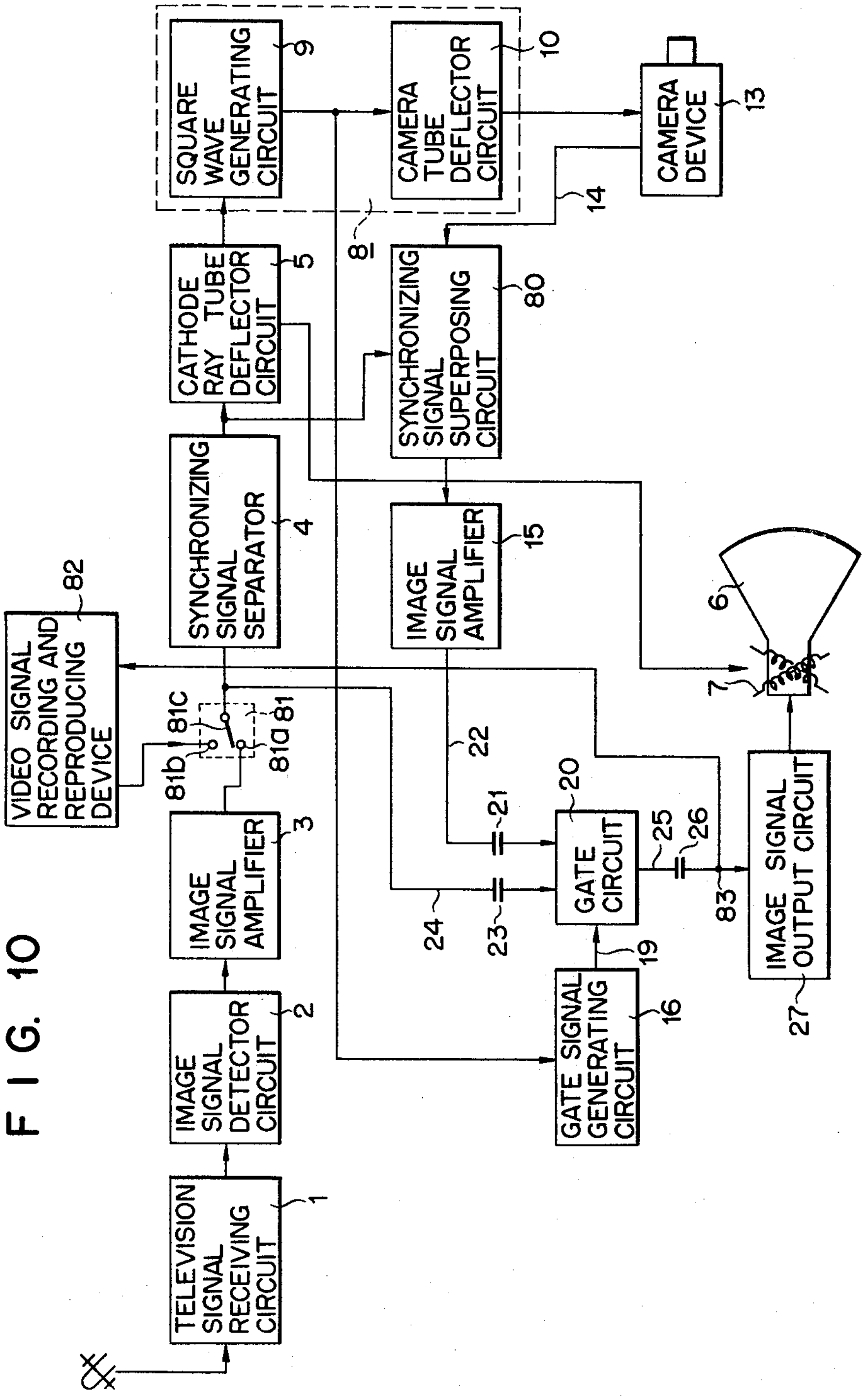
FIG. 10 is a circuit diagram according to another embodiment of the invention where there is coupled a magnetic recording and reproducing apparatus with a cathode ray tube.

This invention further permits effective utilization of a magnetic recording and reproducing apparatus by additionally providing means for superposing TV synchronizing signals on camera image signals and connecting said recording and reproducing apparatus to the circuit of FIG. 1 through a switch. FIG. 10 represents this embodiment. Between the camera device 13 and the camera image signal amplifier 15 is connected a synchronizing signal superposing circuit 80 for superposing TV synchronizing signals on camera image signals 14 not containing any synchronizing signals. Said superposing circuit 80 is supplied with output from the synchronizing signal separator 4. Said superposition can be effected by an ordinary process, for example, by supplying synchronizing signals to the base of a transistor and camera image signals not containing synchronizing signals to the collector of said transistor so as to compose both types of signals. A switch 81 comprises a first fixed contact 81*a* connected to the output terminal of the TV signal amplifier 3, a second fixed contact 81*b* and a movable contact strip 81*c* switched to either of said two fixed contacts 81*a* and 81*b*. Said movable contact strip 81*c* is connected to the input terminal of the synchronizing signal separator 4. The input terminal of the magnetic image recording and reproducing device 82 is connected to the output terminal 83 of condenser 26, and the output terminal of said device 82 is connected to the second fixed contact 81*b* of the switch 81.

Where there are recorded only TV image signals by the aforesaid recording and reproducing apparatus the camera device is stopped and the movable contact strip 81*c* is kept in contact with the first fixed contact 81*a*. Under this arrangement, TV image signals containing TV synchronizing signals are supplied through the gate circuit 20 to the input terminal of the magnetic image recording and reproducing apparatus 82, enabling images containing synchronizing signals to be recorded. Where said recorded images are to be reproduced, the movable contact strip 81*c* is made to contact the second movable contact strip 81*b*. This arrangement enables the recorded image to be reproduced as it is on the screen of the cathode ray tube 6, because said image contains TV synchronizing signals. If, in this case, the camera device is actuated, it will be possible to reproduce part of the recorded TV image and the whole of the camera image or, if required, the camera image alone.

Where the camera image is to be recorded, the movable contact strip 81*c* is made to contact the first fixed contact 81*a* and the camera device 13 is actuated. In this case TV synchronizing signals are superposed on camera image signals. The camera image signals containing said synchronizing signals are through the gate circuit 20 supplied to the magnetic image recording and reproducing apparatus 82 so as to be recorded. When the movable contact strip 81*c* is brought into contact with the second fixed contact 81*b*, the recorded camera image signals are supplied through the gate circuit 20 to the screen of the cathode ray tube 6 so as to be reproduced thereon. As mentioned above, the image to be recorded and reproduced may be so chosen as to consist of a camera image alone or a combination of part of TV image and the whole of a camera image.

This invention has resolved the problem of simultaneously projecting on the same cathode ray tube screen the greater part of a TV image and the whole of a camera image, further enabling with slight modifications only a TV or camera image to be selectively presented, and further permitting the effective utilization of a magnetic recording and reproducing apparatus.

What we claim is:

1. A TV receiver including a cathode ray tube concurrently acting as a monitor comprising:

an amplifier for amplifying received and detected TV image signals, the output of said amplifier containing TV synchronizing signals;

a synchronizing signal separator coupled to the output of said TV image signal amplifier for separating TV synchronizing signals from the output of said TV image signal amplifier;

first deflection means coupled to the output of said synchronizing signal separator for generating deflection signals as a function of the separated TV synchronizing signals and supplying said deflection signals to the cathode ray tube;

at least one camera device for generating camera image signals;

second deflection means coupled to said camera device and including a means for generating square wave synchronizing signals in synchronization with said TV synchronizing signals, said square wave synchronizing signals having a width equal to $1/n$ (where $n \geqq 1$) of the period of said TV synchronizing signals, and means responsive to the output of said square wave generating means for generating triangular wave deflection signals containing a deflecting wave portion having a width equal to that of said square waves, said triangular wave deflection signals being coupled to said camera device as deflection signals therefor, so as to obtain camera image signals scanned with a period equal to $1/n$ of the period of TV synchronizing signals for scanning said TV image signals;

gate signal forming means coupled to said second deflection means for generating gate signals responsive to the square wave synchronizing signals;

gate means coupled to the outputs of said TV image signal amplifier and said camera device for selectively coupling out composite image signals including the amplified TV image signals and camera image signals responsive to the gate signals supplied thereto from said gate signal forming means; and means for supplying said composite image signals to the cathode ray tube to thereby selectively reproduce at least part of a TV image received by the TV receiver and the whole of the camera image from said camera device in different display regions of the cathode ray tube screen.

2. The TV receiver according to claim 1 wherein the square wave synchronizing signals have a pulse width equal to half the period of the TV synchronizing signals.

3. The TV receiver according to claim 1 comprising a plurality of said camera devices scanned responsive to the second deflection means and a switch for selectively supplying the image signals obtained from one of said camera devices to said gate means.

4. The TV receiver according to claim 1 wherein said square wave synchronizing signal generating means of said second deflection means generates first square wave synchronizing signals having a width equal to the period of said TV synchronizing signals, so as to obtain camera image signals scanned with a period equal to the period in which the TV image signals are scanned; and further generates second square wave synchronizing signals having a width equal to half the period of said TV synchronizing signals, so as to obtain camera image signals scanned with a period equal to half the period in which the TV image signals are scanned, deflection signals corresponding to said first and second square wave synchronizing signals being selectively supplied to the deflection means of said at least one camera device.

5. The TV receiver according to claim 1 wherein said square wave synchronizing signal generating means generates both horizontal and vertical synchronizing signals.

6. The TV receiver according to claim 5 wherein said gate signal forming means includes a transistor, the base of which is supplied with one of the horizontal and vertical square wave synchronizing signals obtained from said square wave synchronizing signal generating means; the emitter of which is supplied with the other of said horizontal and vertical square wave synchronizing signals; and from the collector of which there are coupled out gate signals formed by the presence of horizontal square wave synchronizing signals in the positive or negative region of the vertical square wave synchronizing signals per period.

7. The TV receiver according to claim 5 wherein said gate signal forming means generates said gate signals responsive to both said horizontal and vertical synchronizing signals.

8. A TV receiver including a cathode ray tube concurrently acting as a monitor comprising:

an amplifier for amplifying received and detected TV image signals, the output of said amplifier containing TV synchronizing signals;

a synchronizing signal separator selectively coupled to the output of said TV image signal amplifier for separating TV synchronizing signals from the output of said TV image signal amplifier;

first deflection means coupled to the output of said synchronizing signal separator for generating deflection signals as a function of the separated TV synchronizing signals and supplying said deflection signals to the TV cathode ray tube;

at least one camera device for generating camera image signals;

second deflection means coupled to said camera device and including a means for generating square wave synchronizing signals in synchronization with said TV synchronizing signals said square wave synchronizing signals having a width equal to $1/n$ (where $n \geqq 1$) of the period of said TV synchronizing signals, and means for generating deflection signals therefrom, so as to obtain camera image signals scanned with a period equal to $1/n$ of the period in which TV synchronizing signals cause scanning of said TV image signals;

gate signal forming means coupled to said second deflection means for generating gate signals responsive to the square wave synchronizing signals;

means for superposing the TV synchronizing signals on the camera image signals;

gate means coupled to the outputs of said TV image signal amplifier and said camera device for selectively coupling out a composite image signal including the amplified TV image signals and camera image signals responsive to the gate signals supplied thereto from said gate signal forming means;

a magnetic image recording and reproducing apparatus coupled to the output of said gate means, the resulting output from said magnetic image recording and reproducing apparatus being selectively supplied to the synchronizing signal separator in place of the output from the TV image signal amplifier; and means for supplying the composite image signals from the output of said gate means to the cathode ray tube so as to selectively reproduce at least part of a TV image and the whole of a camera in different display regions of the cathode ray tube screen.

9. A TV receiver according to claim 8 wherein said second deflection means further comprises means coupled to said square wave generating means for generating triangular wave signals containing a deflecting wave portion having a width equal to that of said square waves, said triangular waves being coupled to said camera device as deflection signals therefor.

10. The TV receiver according to claim 9 wherein the square wave synchronizing signals have a pulse width equal to half the period of the TV synchronizing signals.

11. The TV receiver according to claim 9 comprising a plurality of said camera devices scanned responsive to the second deflection means and a switch for selectively supplying the image signals obtained from one of said camera devices to said gate means.

12. The TV receiver according to claim 9 wherein said square wave synchronizing signal generating means generates both horizontal and vertical synchronizing signals.

13. The TV receiver according to claim 12 wherein said gate signal forming means generates said gate signals responsive to both said horizontal and vertical synchronizing signals.

14. A TV receiver including a cathode ray tube concurrently acting as a monitor comprising:

an amplifier for amplifying received and detected TV synchronizing signals, the output of said amplifier containing TV synchronizing signals;

a synchronizing signal separator coupled to the output of said TV image signal amplifier for separating TV synchronizing signals from the output of said TV image signal amplifier;

first deflection means coupled to the output of said synchronizing signal separator for generating deflection signals as a function of the separated TV synchronizing signals and supplying said deflection signals to the cathode ray tube;

a plurality of camera devices for generating a plurality of camera image signals;

switch means coupled to the outputs of said camera devices for selectively supplying image signals from one of said camera devices to an output terminal;

second deflection means coupled to said camera device and including a means for generating square wave synchronizing signals in synchronization with said TV synchronizing signals, said square wave synchronizing signals having a width equal to $1/n$ (where $n \geqq 1$) of the period of said TV synchronizing signal, and means for generating deflection signals therefrom, so as to obtain camera image signals scanned with a period equal to $1/n$ of the period of TV synchronizing signals for scanning said TV image signals;

gate signal forming means coupled to said second deflection means for generating gate signals responsive to the square wave synchronizing signals;

gate means coupled to the outputs of said TV image signal amplifier and to said output terminal of said switch means for selectively coupling out composite image signals including the amplified TV image signals and camera image signals responsive to the gate signals supplied thereto from said gate signal forming means; and means for supplying said composite image signals to the cathode ray tube to thereby selectively reproduce at least part of a TV image received by the TV receiver and the whole of the camera image from said camera device in different display regions of the cathode ray tube screen.

15. A TV receiver including a cathode ray tube concurrently acting as a monitor comprising:

an amplifier for amplifying received and detected TV image signals, the output of said amplifier containing TV synchronizing signals;

a synchronizing signal separator coupled to the output of said TV image signal amplifier for separating TV synchronizing signals from the output of said TV image signal amplifier;

first deflection means coupled to the output of said synchronizing signal separator for generating deflection signals as a function of the separated TV synchronizing signals and supplying said deflection signals to the cathode ray tube;

at least one camera device for generating camera image signals;

second deflection means coupled to said camera device and including a means for generating first square wave synchronizing signals in synchronization with said TV synchronizing signals, said first square wave synchronizing signals having a width equal to the period of said TV synchronizing signals, so as to obtain camera image signals scanned with a period equal to the period in which the TV image signals are scanned, and for generating second square wave synchronizing signals in synchronization with said TV synchronizing signals, said second square wave synchronizing signals having a width equal to half the period of said TV synchronizing signals, so as to obtain camera image signals scanned with a period equal to half the period in which the TV image signals are scanned, and means for selectively supplying deflection signals corresponding to said first and second square wave synchronizing signals to the deflection means of said at least one camera device;

gate signal forming means coupled to said second deflection means for generating gate signals responsive to the square wave synchronizing signals;

gate means coupled to the outputs of said TV image signal amplifier and said camera device for selectively coupling out composite image signals including the amplified TV image signals and camera image signals responsive to the gate signals supplied thereto from said gate signal forming means; and means for supplying said composite image signals to the cathode ray tube to thereby selectively reproduce at least part of a TV image received by the TV receiver and the whole of the camera image from said camera device in different display regions of the cathode ray tube screen.

16. A TV receiver including a cathode ray tube concurrently acting as a monitor comprising:

an amplifier for amplifying received and detected TV image signals, the output of said amplifier containing TV synchronizing signals;

a synchronizing signal separator coupled to the output of said TV image signal amplifier for separating TV synchronizing signals from the output of said TV image signal amplifier;

first deflection means coupled to the output of said synchronizing signal separator for generating deflection signals as a function of the separated TV synchronizing signals and supplying said deflection signals to the cathode ray tube;

at least one camera device for generating camera image signals;

second deflection means coupled to said camera device and including a means for generating square wave synchronizing signals in synchronization with said TV synchronizing signals, said square wave synchronizing signals having a width equal to $1/n$ (where $n \geqq 1$) of the period of said TV synchronizing signals, and means for generating deflection signals therefrom so as to obtain camera image signals scanned with a period equal to $1/n$ of the period of TV synchronizing signals for scanning said TV image signals;

gate signal forming means coupled to said second deflection means for generating gate signals responsive to the square wave synchronizing signals said gate signal forming means includes a transistor, the base of which is supplied with one of the horizontal and vertical square wave synchronizing signals obtained from said square wave synchronizing signal generating means; the emitter of which is supplied with the other of said horizontal and vertical square wave synchronizing signals; and from the collector of which there are coupled out gate signals formed by the presence of horizontal square wave synchronizing signals in the positive or negative region of the vertical square wave;

gate means coupled to the outputs of said TV image signal amplifier and said camera device for selectively coupling out composite image signals including the amplified TV image signals and camera image signals responsive to the gate signals supplied thereto from said gate signal forming means; and means for supplying said composite image signals to the cathode ray tube to thereby selectively reproduce at least part of a TV image received by the TV receiver and the whole of the camera image from said camera device in different display regions of the cathode ray tube screen.

* * * * *